(12) United States Patent
Liao (10) Patent No.: US 10,530,957 B2
(45) Date of Patent: Jan. 7, 2020

(54) IMAGE FILING METHOD

(71) Applicant: AVISION INC., Hsinchu (TW)

(72) Inventor: Chun-Chieh Liao, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 15/862,871

(22) Filed: Jan. 5, 2018

(65) Prior Publication Data

US 2018/0131834 A1    May 10, 2018

Related U.S. Application Data

(63) Continuation of application No. 14/813,311, filed on Jul. 30, 2015, now abandoned.

(30) Foreign Application Priority Data

Aug. 11, 2014 (TW) .............................. 103127449 A (51) Int. Cl.
  *H04N 1/21* (2006.01)
  *H04N 1/00* (2006.01)
  *G06K 9/00* (2006.01)
  *G06K 9/20* (2006.01)

(52) U.S. Cl.
  CPC ....... *H04N 1/2166* (2013.01); *G06K 9/00442* (2013.01); *G06K 9/2054* (2013.01); *H04N 1/00641* (2013.01)

(58) Field of Classification Search
  None
  See application file for complete search history.

(56) References Cited

U.S. PATENT DOCUMENTS

| 4,661,988 A | 4/1987 | Shimizu |
| 5,068,745 A | 11/1991 | Shimura |
| 5,173,953 A | 12/1992 | Wataya et al. |
| 5,179,649 A | 1/1993 | Masuzaki et al. |

(Continued)

FOREIGN PATENT DOCUMENTS

| CN | 1245935 A | 3/2000 |
| CN | 2865154 Y | 1/2007 |

(Continued)

OTHER PUBLICATIONS

Taiwan Intellectual Property Office, "Office Action", dated Jan. 29, 2016.

(Continued)

*Primary Examiner* — Anh-Vinh T Nguyen
(74) *Attorney, Agent, or Firm* — Muncy, Geissler, Olds & Lowe, P.C.

(57) ABSTRACT

An image filing method including following steps is provided. At least one sheet is searched form from a plurality of scan image data by an office machine or a computer connected to the scanner. the plurality of scan image data is divided into M groups, and the at least one sheet form is set up in a first image data of each of M groups when there are M sheet forms searched from the plurality of scan image data, wherein M is an integral larger than 1. A keyword string is searched in each of the M sheet forms and an encoded string arranged after the keyword string is identified. M files corresponding to the M groups are created and named according to the encoded strings in each of the M sheet forms.

12 Claims, 7 Drawing Sheets

(56) References Cited

U.S. PATENT DOCUMENTS

| | | |
|---|---|---|
| 5,185,821 A | 2/1993 | Yoda |
| 5,428,727 A | 6/1995 | Kurosu et al. |
| 5,438,426 A | 8/1995 | Miake et al. |
| 5,471,549 A | 11/1995 | Kurosu et al. |
| 5,563,966 A | 10/1996 | Ise et al. |
| 5,672,060 A | 9/1997 | Poor |
| 5,799,115 A | 8/1998 | Asano et al. |
| 6,119,132 A | 9/2000 | Kuwano |
| 6,128,102 A | 10/2000 | Ota |
| 6,633,912 B1 | 10/2003 | Welter et al. |
| 6,731,775 B1 | 5/2004 | Ancin |
| 6,801,327 B1 * | 10/2004 | Haneda .............. H04N 1/00132 358/1.1 |
| 7,113,633 B2 * | 9/2006 | Petrich ...................... G06T 7/40 345/629 |
| 7,180,638 B1 | 2/2007 | Hou et al. |
| 7,181,438 B1 | 2/2007 | Szabo |
| 7,363,246 B1 | 4/2008 | Van Horn et al. |
| 7,412,407 B1 | 8/2008 | Cannella et al. |
| 7,469,246 B1 | 12/2008 | Lamping |
| 7,610,233 B1 | 10/2009 | Leong et al. |
| 7,787,158 B2 | 8/2010 | Matsuda |
| 8,473,532 B1 | 6/2013 | Ben |
| 8,498,984 B1 | 7/2013 | Hwang et al. |
| 8,544,085 B2 | 9/2013 | Fusaka |
| 8,885,951 B1 | 11/2014 | Cristofano et al. |
| 8,892,594 B1 * | 11/2014 | Khafizov .............. G06K 9/4604 707/769 |
| 9,384,364 B1 * | 7/2016 | Ivanov ................ G06F 21/6218 |
| 9,552,377 B2 | 1/2017 | Liao |
| 9,646,288 B2 | 5/2017 | Price |
| 2002/0015161 A1 * | 2/2002 | Haneda ................ G06Q 20/209 358/1.2 |
| 2002/0059334 A1 * | 5/2002 | Jelbert .............. G06F 17/30707 715/273 |
| 2003/0079177 A1 | 4/2003 | Brintzenhofe et al. |
| 2004/0039601 A1 | 2/2004 | Anderson |
| 2005/0097790 A1 | 5/2005 | Sawada et al. |
| 2005/0238257 A1 | 10/2005 | Kaneda et al. |
| 2006/0047637 A1 | 3/2006 | Meyerzon et al. |
| 2006/0061843 A1 | 3/2006 | Sadakuni |
| 2007/0026852 A1 | 2/2007 | Logan et al. |
| 2007/0124414 A1 | 5/2007 | Bedingfield, Sr. et al. |
| 2007/0124500 A1 | 5/2007 | Bedingfield, Sr. et al. |
| 2007/0159533 A1 | 7/2007 | Ayaki |
| 2008/0062472 A1 | 3/2008 | Garg et al. |
| 2008/0082571 A1 | 4/2008 | Sakai et al. |
| 2008/0151330 A1 | 6/2008 | Takahata |
| 2008/0215976 A1 | 9/2008 | Bierner et al. |
| 2008/0250334 A1 | 10/2008 | Price |
| 2010/0005424 A1 * | 1/2010 | Sundaresan ......... G06F 16/5854 715/849 |
| 2010/0104143 A1 | 4/2010 | Paez et al. |
| 2010/0114914 A1 | 5/2010 | Gerges et al. |
| 2010/0179963 A1 * | 7/2010 | Conner .................. G01C 21/32 707/769 |
| 2011/0258182 A1 | 10/2011 | Singh et al. |
| 2012/0069408 A1 | 3/2012 | Tsutsumi |
| 2012/0271812 A1 | 10/2012 | Chung |
| 2013/0103420 A1 | 4/2013 | Massoumi et al. |
| 2013/0124471 A1 * | 5/2013 | Chen .................. H04N 5/23238 707/624 |
| 2013/0238966 A1 | 9/2013 | Barrus |
| 2013/0325539 A1 | 12/2013 | Fritz et al. |
| 2014/0019317 A1 | 1/2014 | Casares et al. |
| 2014/0165211 A1 | 6/2014 | Cohen, Jr. et al. |
| 2015/0039622 A1 | 2/2015 | Sampath-Kumar et al. |
| 2015/0332479 A1 * | 11/2015 | Gershon ............. G06F 16/5838 382/164 |
| 2016/0371543 A1 * | 12/2016 | Smirnov ............. G06K 9/00456 |
| 2018/0025112 A1 * | 1/2018 | Takeda ..................... G06K 9/00 705/2 |

FOREIGN PATENT DOCUMENTS

| | | |
|---|---|---|
| CN | 103093218 A | 5/2013 |
| TW | 201250493 A1 | 12/2012 |

OTHER PUBLICATIONS

CN Office Action dated Mar. 5, 2018 in Chinese application (No. 201410608004.8).

* cited by examiner

IMAGE FILING METHOD

This application is a Continuous Application of co-pending U.S. application Ser. No. 14/813,311 filed Jul. 30, 2015, which claims the benefit of Taiwan application Serial No. 103127449, filed Aug. 11, 2014, the subject matters of which are incorporated herein by reference.

BACKGROUND OF THE INVENTION

Field of the Invention

The invention relates in general to a scanner, and more particularly to an image filing method used in a scanner.

Description of the Related Art

In the electronic age, it is an inevitable trend to store image data for the purpose of file management to reduce the stock of paper data and avoid the risk of the paper data being damaged. Once the paper data are electronized, electronic files can be created to record the transactions of documents, such that documents can be filed and inquired. However, it will incur a large amount of labor and cost to input a large volume of data to a computer, and further classify and file the input data. When a conventional scanner scans a plurality of documents, the scanner can either create a file for the scan image data of each page respectively or combine the image data of all pages into one file. However, both approaches are inconvenient to the user. When the former approach is used, the user has to check and rename the file. When the latter approach is used, the user has to split the file manually. Both approaches are inefficient and involve tedious processing.

To resolve the above problem, the concept of automatic filing is provided. For example, when the user needs to scan a pile of documents, the user can insert a blank page, a specific color page or a barcode to split the documents. When the scanner scans the blank page, the specific color page, or the barcode, the scanner automatically combines the scanned image data as an independent file. However, the user has to manually insert specific identification marks. For example, the user has to manually insert a blank page or attach a barcode to a specific position in advance, and a considerable amount of time is needed accordingly.

SUMMARY OF THE INVENTION

The invention is directed to an image filing method. The sheet form of data, having a standard form such as application form, proposal, or invoice, is automatically determined after the scan image data is identified, and when the sheet forms of the same type or the sheet forms conformed to system setting are found, these scan image data can be divided into a plurality of groups and stored as independent files, and corresponding file names can be created.

According to a first aspect of the present invention, an image filing method including following steps is provided. At least one sheet is searched form from a plurality of scan image data by an office machine or a computer connected to the scanner. the plurality of scan image data is divided into M groups, and the at least one sheet form is set up in a first image data of each of M groups when there are M sheet forms searched from the plurality of scan image data, wherein M is an integral larger than 1. A keyword string is searched in each of the M sheet forms and an encoded string arranged after the keyword string is identified. M files corresponding to the M groups are created and named according to the encoded strings in each of the M sheet forms.

According to a second aspect of the present invention, an image filing method including following steps is provided. A sheet form is searched from an initial scan image data. When the sheet form appears in the initial scan image data, the initial scan image data having the sheet form is set as the home page. A keyword string in the sheet form is searched and an encoded string arranged after the keyword string is identified. An initial file corresponding to the initial scan image data is created and named according to the encoded string in the sheet form.

The above and other aspects of the invention will become better understood with regard to the following detailed description of the preferred but non-limiting embodiment(s). The following description is made with reference to the accompanying drawings.

DETAILED DESCRIPTION OF THE INVENTION

Based on an exemplary example of the present embodiment, an image filing method used in the filing and management of the scan image data is provided. After a pile of documents is scanned, M sheet forms of the same type or conformed to system setting are searched from these scan image data, and the system automatically determines that this pile of documents at least contains M groups, and the sheet forms in each group have the same type. Therefore, after these scan image data are divided into M groups, these scan image data in each group are stored as an independent file respectively. Moreover, the system can create a corresponding file name for each group to expedite the filing of these scan image data.

For example, the scan image data can be patients' medical history of a hospital, the first page records each patient's basic personal information or first visit information, and the medical history of subsequent visits is normally appended to the basic personal information as an appended image data. In general, for the convenience of creating basic personal information, the home page of the first visit information is a standard form or application form recording information such as basic personal information and file number. Everyone has a personal form of home page. During the process of scanning and determining a pile of visit information, when the first visit information appears again, this indicates that system has finished scanning the visit information of previous patient and is currently scanning the visit information of another patient. Meanwhile, the system automatically divides the scan image data into different groups according to the form of home page, and further creates a personal file after setting the first visit information as home page. By doing so, different patients' visit information can be filed.

Besides, these scan image data can be official documents or proposals of government agencies, and each government agency has its own form of home page. When a recipient agency receives documents from an issuing agency, the received documents are scanned so that the form of home page can be determined, and the received documents can be automatically divided into different groups according to the issuing agencies, and the files corresponding to different groups can be created to expedite the filing of these scan image data.

Moreover, these scan image data can be bank credit notes or debit notes. Each bank has its own form of home page. After data received by the accounting unit from the banks are scanned, the system determines the format of the home page of the bank and automatically divides the data received from the banks into different groups according to the banks, and creates files corresponding to the groups to expedite the filing of these scan image data.

Whether the form of home page is a standard form or an exclusive form of home page, the above image filing method can be used for dividing these scan image data into different groups and creating files corresponding to the groups.

A number of embodiments are disclosed for detailed descriptions of the invention. However, the embodiments disclosed below are for exemplary and explanatory purposes only, not for limiting the scope of protection of the invention.

First Embodiment

Figure 1:
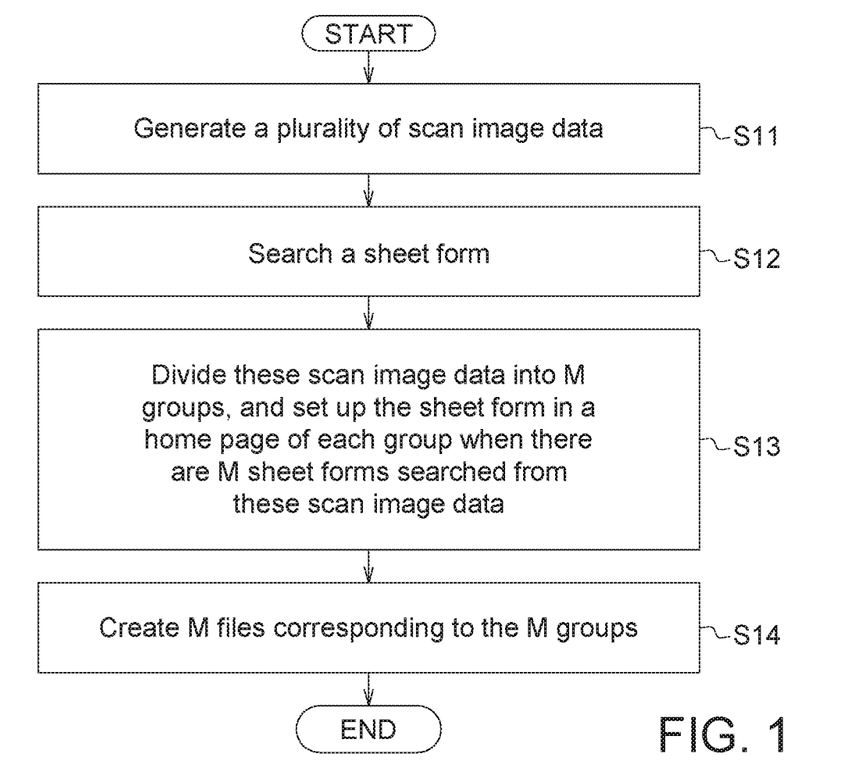
FIG. 1 is a flowchart of an image filing method according to a first embodiment of the invention.

Referring to FIG. 1, a flowchart of an image filing method according to a first embodiment of the invention is shown. The image filing method includes steps S11~S14. In step S11, a pile of documents is fed to a scanner and is scanned to generate a plurality of scan image data, which is representative of ordered images of separate pages of multiple originals scanned by the scanner and corresponding to the group. The format of these scan image data can be electronic files with text such as pdf or rtf. In step S12, a sheet form is searched from the image scan data. The sheet form can be a standard form such as an application form, a proposal or an invoice form, and is thus representative of an image of a page of a comparison document. In step S13, when there are M sheet forms searched from these scan image data, these scan image data are divided into M groups, and the sheet form is set up in the home page of each group. So, one of the M files corresponding to one of the M groups comprises an image of the sheet form corresponding to the group followed by adjacent two continuous ones of the ordered images of the separate pages of the originals, and is representative of continuos ones of the ordered images of the separate pages of the originals scanned by the scanner and corresponding to the group.

For example, these scan image data can be patients' medical history of a hospital, the first page records each patient's basic personal information or first visit information. Meanwhile, the sheet form of home page can be used as a reference for setting the file, and these scan image data are divided into different groups according to the home page of each group.

In step S14, M files corresponding to the M groups are created. Therefore, these scan image data can be split into different files according to the home page of each group, and these files are named and then these file names are created respectively.

Figure 2:
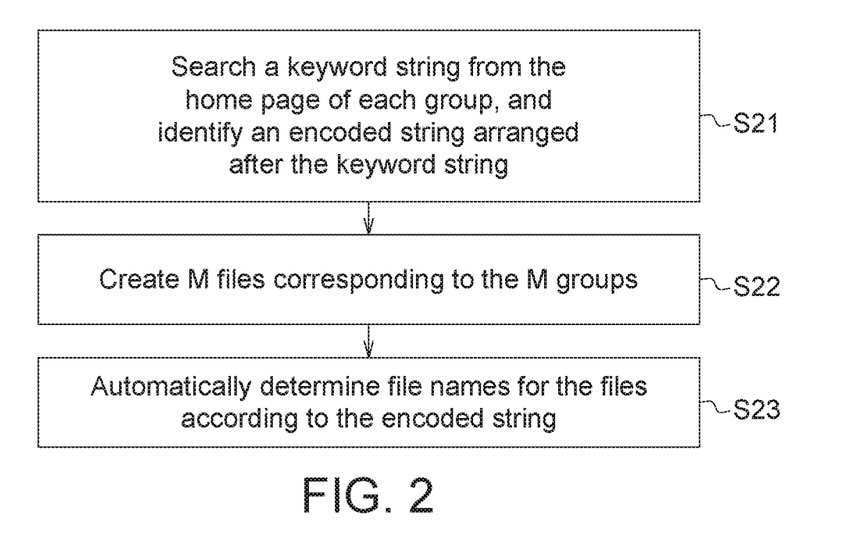
FIG. 2 is a flowchart of creating file names.

Referring to FIG. 2, a flowchart of creating file names is shown. In an embodiment, the file naming method of an embodiment includes following steps S21~S23. In step S21, a keyword string is searched from the home page of each group, and an encoded string arranged after the keyword string is identified. For example, in FIG. 5, the scan image data are divided into three groups G1~G3, and the home page of each group has the same sheet form.

Figure 5:
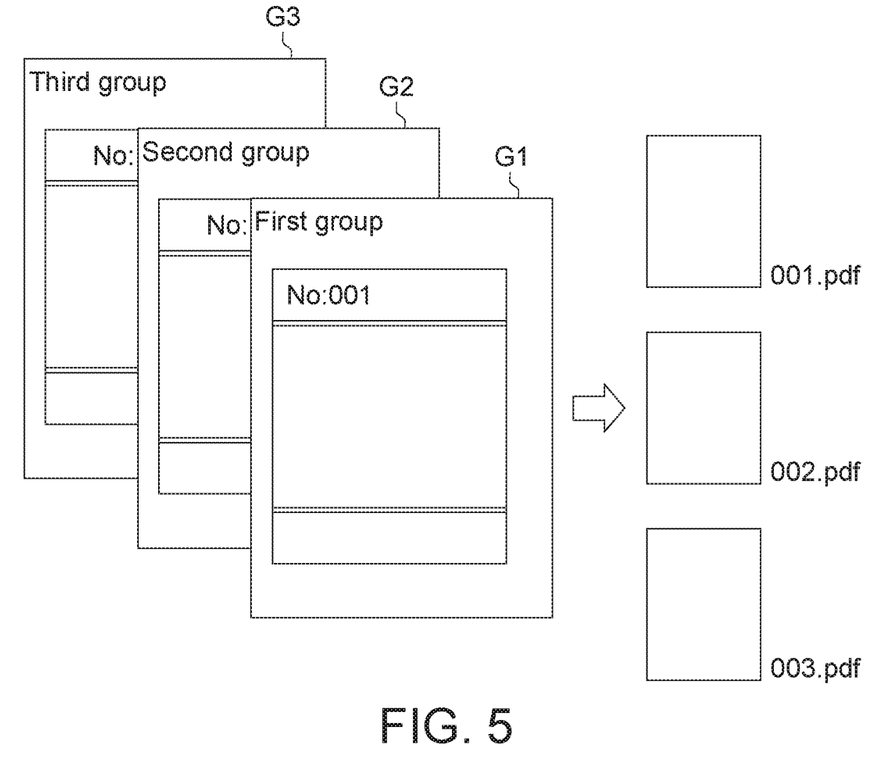
FIG. 5 is a schematic diagram of scan image data and files divided into different groups.

In the form of home page of the first group G1, there is a text passage: "No. 001". If "No." is a keyword string, then "001" is its encoded string. In step S22, M files corresponding to the M groups are created. In step S23, if the keyword string is found, then a files name will be automatically determined for each file according to the encoded string. The file names are not limited to the encoded string, and can also be other variations based on the encoded string. For example, if the encoded string is '001', then the file name can be 001-1, PR-001, data 001, or other variations.

The file names of the files in the second group G2 can be exemplified by 002.pdf or other variations, such as 002-1, PR-002, and data 002. The file names of the files in the third group G3 can be exemplified by 003.pdf or other variations, such as 003-1, PR-003 and data 003.

Second Embodiment

Figure 3:
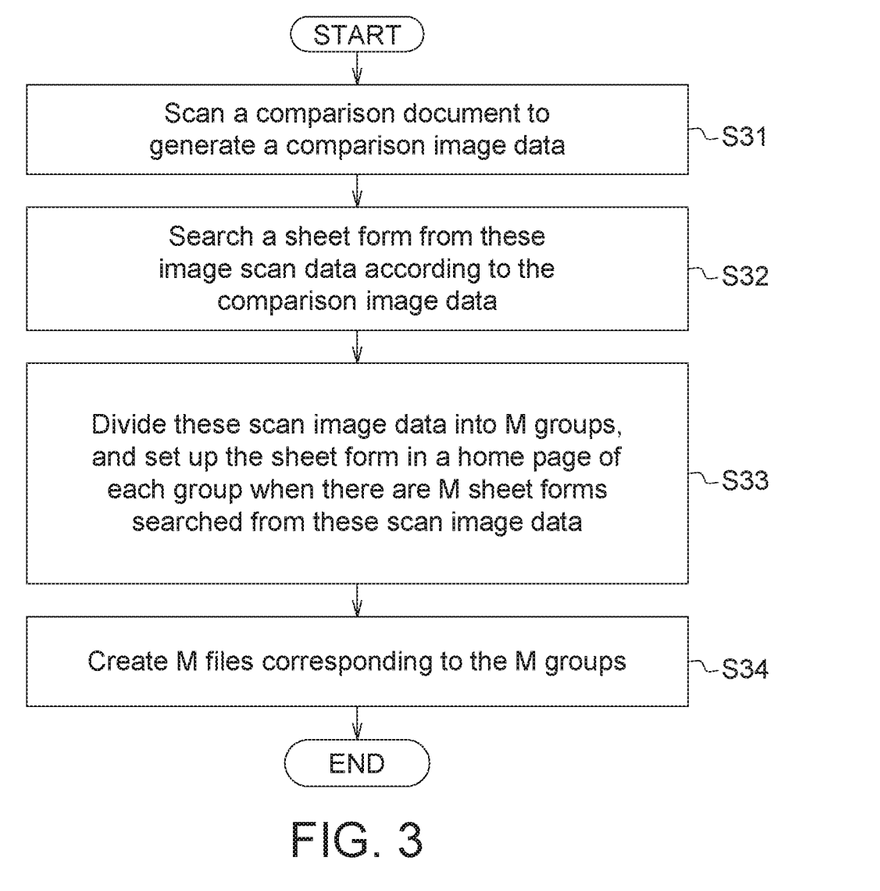
FIG. 3 is a flowchart of an image filing method according to a second embodiment of the invention.

Also, the invention provides a second embodiment. Referring to FIG. 3, a flowchart of an image filing method according to a second embodiment of the invention is shown. The method of the second embodiment includes steps S31~S34, wherein steps S33~S34 are the same as steps S13~S14 of the first embodiment. In steps S31~S32, the method further includes scanning a comparison document to generate a comparison image data, and, a sheet form is searched from the image scan data according to the comparison image data. In step S32, if a sheet form conformed to the settings is found, then step S33 of grouping these scan image data and step S34 of creating files are performed.

The comparison image data can be an image data having a blank sheet form. If there is only one single sheet form for comparison, the system will search for the image data having the same sheet form. If there are two or more than two sheet forms for comparison, the system will search for the image data having each of the sheet forms for comparison. As indicated in FIG. 5, if the first group G1 has the first sheet form, the second group G2 has the second sheet form, and the third group G3 has the third the sheet form, then the system will search the three sheet forms from these scan image data and divide these scan image data into at least three groups G1~G3 according to the three sheet forms for splitting these scan image data into different files.

The file naming method used in the first embodiment can also be used in the second embodiment. Related contents are disclosed with reference to the descriptions of FIG. 2 and are not repeated here.

Third Embodiment

Figure 4:
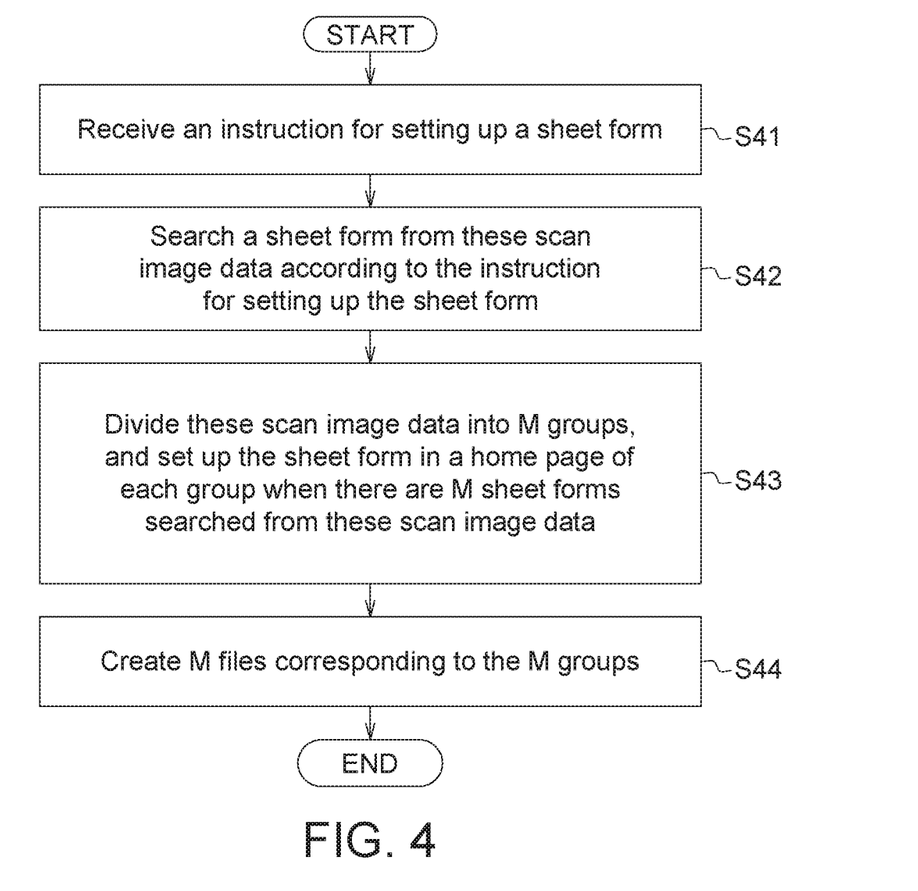
FIG. 4 is a flowchart of an image filing method according to a third embodiment of the invention.

Besides, a third embodiment is provided. Referring to FIG. 4, a flowchart of an image filing method according to a third embodiment of the invention is shown. The method of the third embodiment includes steps S41~S44, wherein steps S42~S44 are the same as steps S13~S14 of the first embodiment. In steps S41~S42, the method further includes receiving an instruction for setting up a sheet form, and searching a sheet form from these scan image data according to the instruction for setting up the sheet form.

The setting of the sheet form is, for example, shown on a user interface such that the user can set up an instruction for searching sheet form on the user interface. The user interface can be realized by a display screen or an input device of a scanner or an office machine, or a computer connected to the scanner. The user can operate the software of the computer to instruct the scanner. In step S42, a sheet form is searched from these scan image data according to the instruction for setting up the sheet form. In step S42, if a sheet form conformed to the settings is found, then step S43 of grouping these scan image data and step S44 of creating files are performed.

The settings of sheet form can set up a single sheet form or multiple sheet forms pre-stored in the computer. If there is only one single sheet form available, the system will search for only the image data having the same sheet form for comparison. If there are two or more than two sheet forms available, the system will search for the image data having each of the sheet forms for comparison. As indicated in FIG. 5, if the first group G1 has the first sheet form, the second group G2 has the second sheet form, and the third group G3 has the third the sheet form, then the system will search the three sheet forms from these scan image data and then divide these scan image data into at least three groups G1~G3 according to the three sheet forms to split these scan image data into different files.

The file naming method used in the first embodiment can also be used in the third embodiment. Related contents are disclosed with reference to the descriptions of FIG. 2 and are not repeated here.

Fourth Embodiment

Figure 6:
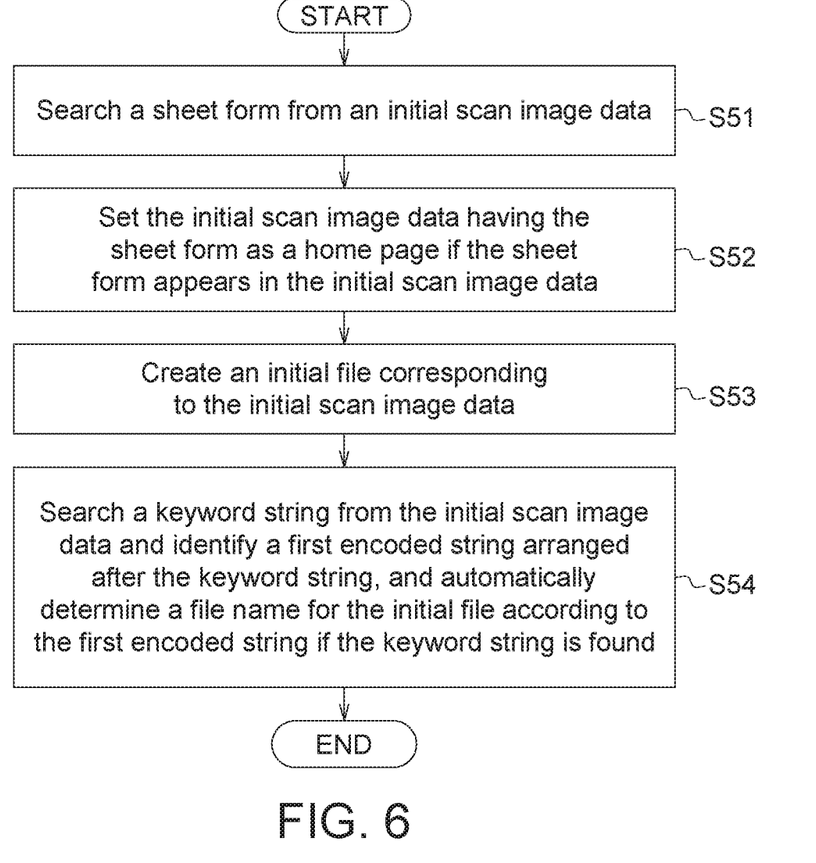
FIG. 6 is a flowchart of an image filing method according to a fourth embodiment of the invention.

Besides, a fourth embodiment is further provided. Referring to FIG. 6, a flowchart of an image filing method according to a fourth embodiment of the invention is shown. The method of the fourth embodiment includes following steps S51~S54. In step S51, a sheet form is searched from an initial scan image data. In step S52, if the sheet form appears in the initial scan image data, the initial scan image data having the sheet form is set as a home page of a group followed by adjacent two continuous ones of the ordered images of the separate pages of the originals corresponding to the group. In step S53, an initial file corresponding to the initial scan image data is created. In step S54, a keyword string is searched from the initial scan image data and a first encoded string arranged after the keyword string is identified, and a file name is automatically determined for the initial file according to the first encoded string if the keyword string is found.

For example, the initial scan image data can be personal medical history data of a hospital, departmental official documents or proposals, or invoices of each bank. Meanwhile, the sheet form of home page can be used as a reference for the settings of file, and the initial file can be created according to the keyword string in the home page. In an embodiment, the sheet form can be a standard form such as an application form, a proposal or an invoice form.

Fifth Embodiment

Figure 7:
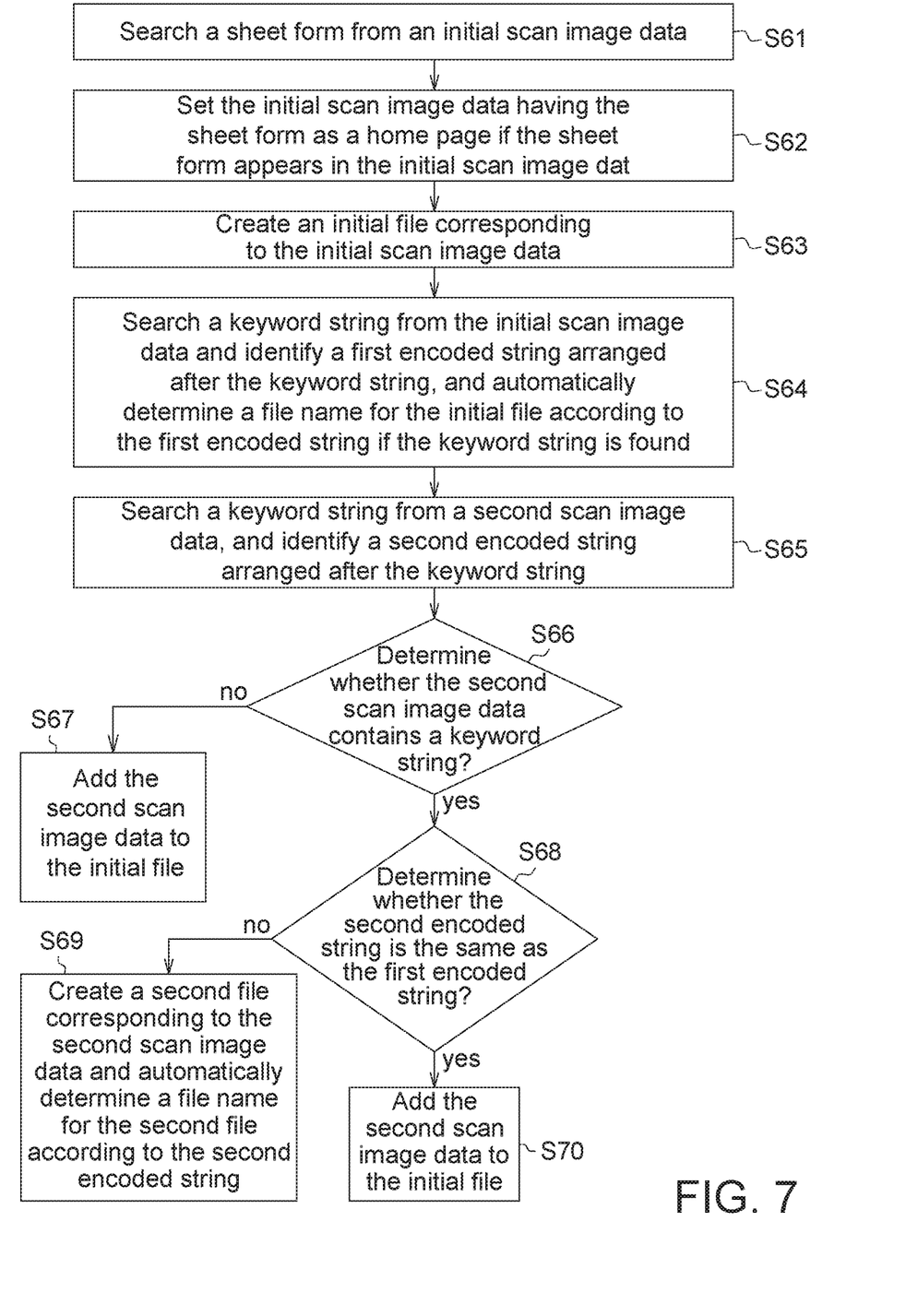
FIG. 7 is a flowchart of an image filing method according to a fifth embodiment of the invention.

Additionally, a fifth embodiment is further provided. Referring to FIG. 7, a flowchart of an image filing method according to a fifth embodiment of the invention is shown. The method of the fifth embodiment includes following steps S61~S70, wherein steps S61~S64 are the same as steps S51~S54 of the fourth embodiment. In step S65, the method further includes searching a keyword string from a second scan image data, and identifying a second encoded string arranged after the keyword string. The second scan image data can be another scan image data arranged after the initial scan image data. In step S66, whether the second scan image data contains a keyword string is determined. If a keyword string is searched from the second scan image data in step 66 and it is determined in step 68 that the second encoded string is not the same as the first encoded string (the encoded string of the initial scan image data of step S64), then the method proceeds to step S69. In step S69, a second file corresponding to the second scan image data is created, and a file name is automatically determined for the second file according to the second encoded string. The second file can be named according to the naming method used for the initial file, and a series of files can be created accordingly. For example, the encoded strings of the initial and second scan image data are 001 and 002, respectively. If the initial file is named as 001-1, then the second file can be named as 002-1. If the initial file is named as data 001, then the second file can be named as data 002. Based on this method, a plurality of documents having keywords can be scanned in sequence to name and create different files automatically.

If a keyword string is searched from the second scan image data in step S66, and it is determine in step S68 that the second encoded string is the same as the encoded string of the initial scan image data of step S64, then the method proceeds to step S70. In step S70, the second scan image data is added to the initial file rather than generating an independent second file for the second scan image data. For example, the initial file originally is a pdf file containing the initial scan image data and has one page in total. After the second scan image data is added to the initial file, the initial scan image data and the second scan image data respectively are the first page and the second page of the pdf file. If a third scan image data arranged after the second scan image data has the same keyword and encoded string with the initial scan image data, then the third scan image data is also added to the initial file and form a third page of the pdf file until the next form of home page appears, the scan image data are split, and a new file is created.

In step S66, if no keyword string is searched from the second scan image data, then the method proceeds to step S67. In step S67, the second scan image data is added to the initial file such that the second scan image data and the initial file are combined as a file. Furthermore, the second scan image data not containing the keyword string is a scan image data arranged after the initial scan image data. That is, the initial scan image data and the second scan image data respectively are generated from a first document and a second document of a plurality of documents scanned in a scanning procedure. The scanning procedure is normally executed in a sheet-fed scanner. The initial scan image data has a keyword string but the second scan image data does not. This situation may happen in a scanning procedure when a main document and its attachment not containing the keyword are scanned.

Sixth Embodiment

Figure 8:
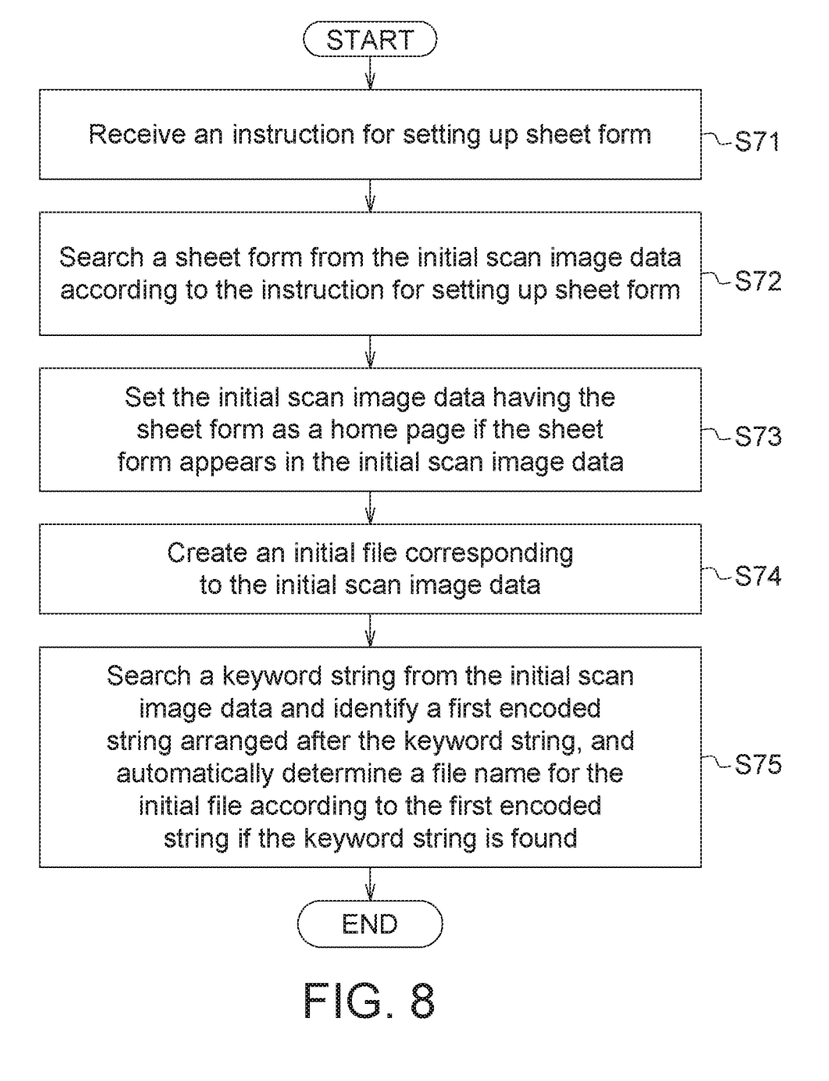
FIG. 8 is a flowchart of an image filing method according to a sixth embodiment of the invention.

Besides, a sixth embodiment is further provided. Referring to FIG. 8, a flowchart of an image filing method according to a sixth embodiment of the invention is shown. The method of the sixth embodiment includes following steps S71~S75, wherein steps S73~S75 of the sixth embodiment are the same as steps S52~S54 of the fourth embodiment. In steps S71~S72, the method further includes receiving an instruction for setting up a sheet form, and searching a sheet form from the initial scan image data according to the instruction for setting up the sheet form. In step S73, if the sheet form conformed to the settings is found, then step S74 of creating files and step S75 of naming files are performed.

Descriptions regarding the settings of the sheet form are disclosed above and are not repeated here.

The image filing method disclosed in above embodiments of the invention can be used in the filing and management of the image data. According to the method of the invention, these scan image data are automatically spit into different files according to the sheet forms without having to insert any blank pages, specific color pages or barcodes to the documents, so that a large amount of labor can be saved. Furthermore, the image data stored in a file can be directly identified from its file name and file management can be made easier.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image filing method used in conjunction with a scanner, the image filing method comprising:
    searching at least one sheet form, representative of an image of a page of a comparison document, from a plurality of scan image data, which is representative of ordered images of separate pages of multiple originals scanned by the scanner, by an office machine or a computer connected to the scanner;
    dividing the plurality of scan image data into M groups, and setting up the at least one sheet form in a first image data of each of the M groups when there are M sheet forms searched from the plurality of scan image data, wherein M is an integral larger than 1;
    searching a keyword string in each of the M sheet forms and identifying an encoded string arranged after the keyword string; and
    creating M files corresponding to the M groups and the M files are named according to the encoded strings in each of the M sheet forms, wherein one of the M files corresponding to one of the M groups comprises an image of the sheet form corresponding to the group followed by
    adjacent two continuous ones of the ordered images of the separate pages of the originals, and is
    representative of continuous ones of the ordered images of the separate pages of the originals
    scanned by the scanner and corresponding to the group.

2. The image filing method according to claim 1, further comprising:
    scanning the comparison document to generate a comparison image data; and
    comparing the at least one sheet form with the comparison image data to search the at least one sheet form from the plurality of scan image data.

3. The image filing method according to claim 1, further comprising:
    receiving an instruction for setting up the at least one sheet form pre-stored in the office machine or the computer; and
    searching the sheet form from the plurality of scan image data according to the instruction for setting up the at least one sheet form.

4. The image filing method according to claim 1, wherein a plurality of the sheet forms is pre-stored in the office machine or the computer, and the M groups have different types of the sheet forms respectively.

5. The image filing method according to claim 1, wherein the M files have the same file format.

6. An image filing method used in conjunction with a scanner, the image filing method comprising:
    searching a sheet form, representative of an image of a page of a comparison document, from an initial scan image data, which is representative of ordered images of separate pages of multiple originals scanned by the scanner;
    when the sheet form appears in the initial scan image data, setting the initial scan image data having the sheet form as a home page of a group followed by adjacent two continuous ones of the ordered images of the separate pages of the originals corresponding to the group;
    searching a keyword string in the sheet form and identifying an encoded string arranged after the keyword string; and
    creating an initial file corresponding to the initial scan image data and the initial file is named according to the encoded string in the sheet form.

7. The image filing method according to claim 6, further comprising:
    searching the keyword string from a second scan image data and identifying a second encoded string arranged after the keyword string,
    adding the second scan image data to the initial file if the keyword string is found and it is determined that the second encoded string is the same as the first encoded string.

8. The image filing method according to claim 7, wherein if the keyword string is not found, the second scan image data is added to the initial file.

9. The image filing method according to claim 7, wherein the second scan image data is a scan image data generated following the initial scan image data.

10. The image filing method according to claim 6, further comprising: receiving an instruction for setting up the sheet form pre-stored in an office machine or a computer connected to the scanner; and searching the sheet form from the initial scan image data according to the instruction for setting up the sheet form.

11. The image filing method according to claim 6, wherein the sheet form is a standard form selected from a group consisting of an application form, a proposal or an invoice form.

12. The image filing method according to claim 6, wherein the initial scan image data is selected from a group consisting of personal medical history data of a hospital, data of departmental official documents and proposals, and data of invoices of banks.

* * * * *